United States Patent

[11] 3,624,687

[72] Inventors Lloyd A. Cagnolatti
  115 Patricia St., Gonzales, La. 70737;
  John Drew, 3759 Jose Terrace,
  Jacksonville, Fla. 32217
[21] Appl. No. 41,395
[22] Filed May 28, 1970
[45] Patented Nov. 30, 1971

[54] APPARATUS FOR TEACHING ADDITION OF PAIRS OF ONE-DIGIT NUMBERS
9 Claims, 7 Drawing Figs.
[52] U.S. Cl. ................................................. 35/31 C
[51] Int. Cl. ......................................... G09b 19/02
[50] Field of Search ............................. 35/31 R, 31 A, 31 C, 9 A, 74, 75, 76, 77

[56] References Cited
UNITED STATES PATENTS
2,317,107 4/1943 Oesch ........................... 35/31 C X
2,152,777 4/1939 Swindell ....................... 35/77

Primary Examiner—Wm. H. Grieb
Attorney—Llewellyn A. Proctor

ABSTRACT: Apparatus comprising an educational toy for instructing beginning students in addition of pairs of one-digit numbers. Preselected pairs of numbers are displayed, each on a different rotating cylinder, or roll. Each roll of the pair is scribed with a set of one-digit numbers. Each is rotated through a series of fractional rotations, of constant angle, via action of a drive roll which rotates in similar manner, and which in turn is actuated by a series of keyed slide bars which represent answers to the problems displayed. When the correct key, of the keyboard, is manipulated, a roll of the scribed pair is rotated, in response to a movement of the drive roll, through a fraction of a revolution to present the next problem, and a signal to indicate a correct solution is given. No response is given to an incorrect solution.

INVENTORS
LLOYD A. CAGNOLATTI
JOHN DREW
ATTORNEY

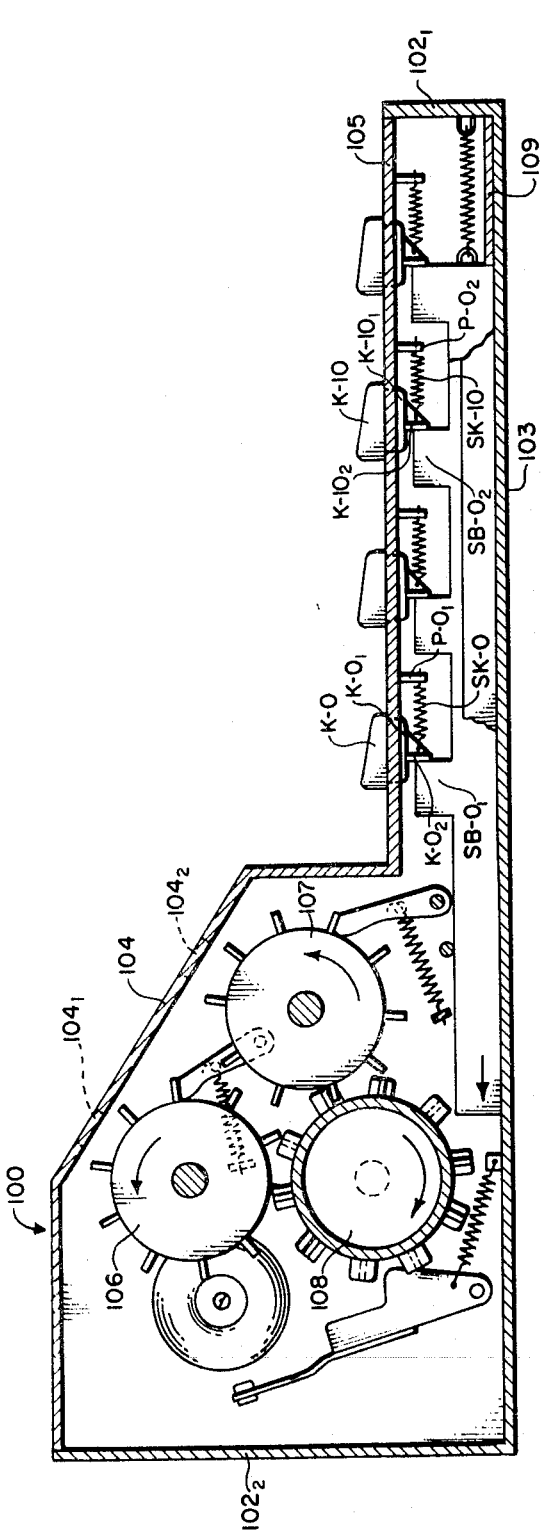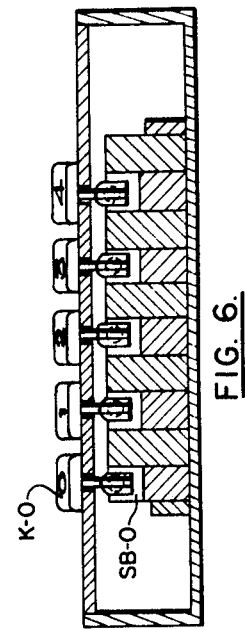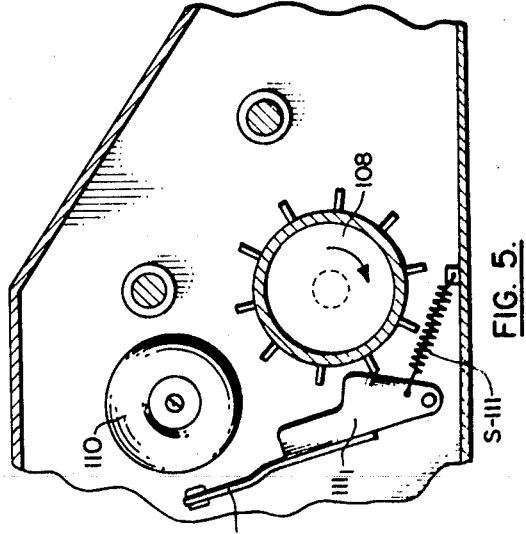

APPARATUS FOR TEACHING ADDITION OF PAIRS OF ONE-DIGIT NUMBERS

Beginning school children begin to learn simple arithmetic as the basis for the science of mathematics. After learning to count, and after learning the value of the different numerals, the child must face, in the conventional number system, the unpleasant task of memorizing the 100 addition combinations of two one-digit numerals. This requires up to 2 years for the average child, and is so difficult and painful that many of the youngsters develop a life-long dislike for the science of mathematics. Teachers and parents must coax and prod, encourage study, and finally test the child to ascertain the extent of progress achieved.

The necessity of teaching the addition of one-digit numbers is fundamental and basic to the study of the science of mathematics and, however painful, the additions must be learned.

Accordingly, it is the primary objective of the present invention to obviate this and other difficulties by providing a new and improved apparatus for use in learning the addition of pairs of one-digit numbers.

In particular, it is an object to provide an apparatus for presenting pairs of one-digit numerals, offer a choice of solutions to the problems, provide a signal or response to the correct solution at which time another problem will presented.

More particularly, it is an object to provide apparatus of such character wherein the 100 possible combinations of numbers zero through nine, of the conventional number system, are presented in irregular sequence.

A further object is to provide apparatus, or an educational toy, which will enable the beginning student to learn and retain the entire set of numbers simultaneously, and learning will be more pleasant because, instead of memorizing, the beginner will be experimenting to find the solution to a problem, the answer of which is withheld.

These and other objects are achieved in accordance with the apparatus of the present invention comprising a housing, constituted of a pair of vertical parallel sidewalls, end walls, and an enclosing bottom or floor board within which is contained the essential mechanism. Preferably, the housing is enlarged at one end, and within the sidewalls there is journaled a plurality of at least three separate cylindrical members, or rolls—viz, a drive roll and two secondary rolls upon which a series of one-digit numbers are scribed—mounted side-by-side and meshed or geared together so that a series of fractional rotations of constant angle, of the drive roll will produce corresponding angular rotations of the secondary rolls in alternate patterned sequence.

A keyboard is provided at the opposite end of the housing, this consisting of a series of reciprocable keys numbered 0 through 19 mounted on a cover panel. The keys are operatively engaged to independently reciprocably movable slide bars, 10 in number, mounted upon the floor plate beneath the cover panel. Reciprocation or movement of a slide bar, representing a correct solution to an arithmetic problem displayed by the pair of secondary rolls, actuates and rotates the drive roll, which in turn actuates and rotates the secondary rolls in prearranged pattern. In response to a correct solution, a signal is given, and a new problem is presented by rotation of one of the pair of secondary rolls. No response is given to an incorrect solution, and movement of a slide bar representative of an incorrect solution produces no change in the position of the rolls.

The basis for the design of the preferred apparatus results from the following observations with numbers: suppose, for simplicity, that the numerals are aligned in two rows, one in ascending and one in descending order:

0 1 2 3 4 5 6 7 8 9
9 8 7 6 5 4 3 2 1 0

Ten addition combinations are formed, and the sum of each is 9. Suppose, further, that each row is transformed into a circular pattern and affixed on a separate cylinder or roll, with the two cylinders posed one above or adjacent to the other and caused to rotate, one relative to the other. Suppose one roll or cylinder is moved through a 36° angle relative to the other. When the cylinders are in this position, viz, 1 2 3 4 5 6 7 9 0
9 8 7 6 5 4 3 2 1 0 nine of the sums are 10 and one is 0. Now suppose that the upper roll is rotated to the left through a 36° angle, or through one-tenth of a revolution, and until a revolution is completed and each time a 36° angle is completed the sums are recorded. The tabulation of sums for the 100 combinations would be ten nines nine tens and one zero eight elevens and two ones seven twelves and three twos six thirteens and four threes five fourteens and five fours four fifteens and six fives three sixteens and seven sixes two seventeens and eight sevens one eighteen and nine eights. Note that the last digit of the sums is the same for any fixed position of the rolls in relation to each other. This presents a method of simplifying the 100 problems into 10 for the purpose of this invention, which is, in its most preferred embodiment, to design the simplest device to achieve the objects earlier described. There are, in the conventional numbers system, only 10 possibilities of positional relationship with respect to the two rolls, if each is permitted to stop only in 10 positions in its rotation. The device can thus be made to present a problem by baring to view only one pair of numerals, one above the other, one on each roll; and the rolls could be rotated from this position by motion of a lever or slide bar which would be activated by one of two buttons corresponding to the two possible correct answers. Only one cylinder would be repositioned at a time, and it does not matter that either of the two sum numbers would indicate a correct answer while only one is, in fact, correct because if, e.g., a child is even only vaguely appreciative of the value of numbers, which is a prerequisite to the use of this invention, then he will not try "two" for the answer of the problem "six plus six," although he might try numbers from 10 to 14.

The next concern is the order in which the problems will be presented. If the rolls were scribed as previously supposed, and one roll shifted only one position at a time, the answers would be in numerical sequence in either ascending or descending order. This could render the invention useless, since a child would soon learn to anticipate the next answer before the problem is presented, because he probably will have learned to count both forwards and backwards by the time he is presented with this device. If, on the other hand, either roll were moved two positions (or four or five) at each instance, then all the combinations of digits cannot be presented. The only remaining possibility is for the moving roll to shift three positions at a time, either forward or backward, and three forward is the same as seven backward, and vice versa. It is preferred, although not limited by this invention, to arrange for the answers to come up in descending order with each sum being three less than the previous one. The order of the last digit in each sum would follow the pattern: zero-seven-four-one-eight-five-two-nine-six-three. The reverse pattern is chosen because a bright child might learn to count by threes at an early age. Also, the shifting of three positions in one move is better accomplished, for the purposes of this invention, by arranging the digits about the periphery of the rolls in ascending order of threes in one case and in descending order of threes in the other, and shifting the rolls only one position on each move.

The final arrangement which must be decided is the sequence in which the two rolls are repositioned, since this determines the all-important order in which the problems are presented. If simple alternation is used, i.e., one-two-one-two, it will become evident by recording the problems presented that a 20-problem cycle is repeated, and 80 combinations are never shown. At the other extreme, if one cylinder is moved nine times relative to one movement of the other, all combinations will be presented but one numeral will be part of the problem for too many times in succession. Although this sequence has some desirable advantages, and is not excluded from this invention, the preferred apparatus uses the relative sequence one-one-two-one-one-two-one-one-one-two (and repeats ad infinitum). This is an order which may be proven by trial and error to be the one which presents the 100 combinations once each in a sequence which is furthest removed from simple numerical one-unit progression or regression.

These and other features and advantages will be better understood by reference to the following detailed description and to the accompanying drawings to which reference is made in the description.

Referring to the drawings:

FIG. 1 is a plan view, in partial section, showing a preferred apparatus including a housing wherein a pair of separately mounted cylindrically shaped members, or rolls, about the circumference of each of which is scribed a series of numbers ranging from 0 through 9, are driven in predetermined pattern by a third roll, or drive roll, which turns or rotates through a series of fractional rotations, of constant angle, to produce corresponding fractional rotations of one or the other of the roll pair (via meshing cogs) and thereby expose pairs of numbers for additive solution, in response to a series of slide bars (which act upon individual cogs located on the drive roll) actuated by the numbered keys of a keyboard which also represent the correct solutions to the pairs of numbers previously displayed upon the pair of rolls;

FIG. 2 is a side elevation view, taken along lines 2—2 of the preceding figure, showing in more detail the arrangement of the pair of rolls upon which numbers are displayed, the drive roll, and the keyed slide bars which act thereupon;

FIG. 5 is a fragmentary section view, taken along lines 5—5 of FIG. 1, this view showing the relationship between the drive roll and its action in sounding a bell for each individual partial rotation or movement of the former;

Figure 1:
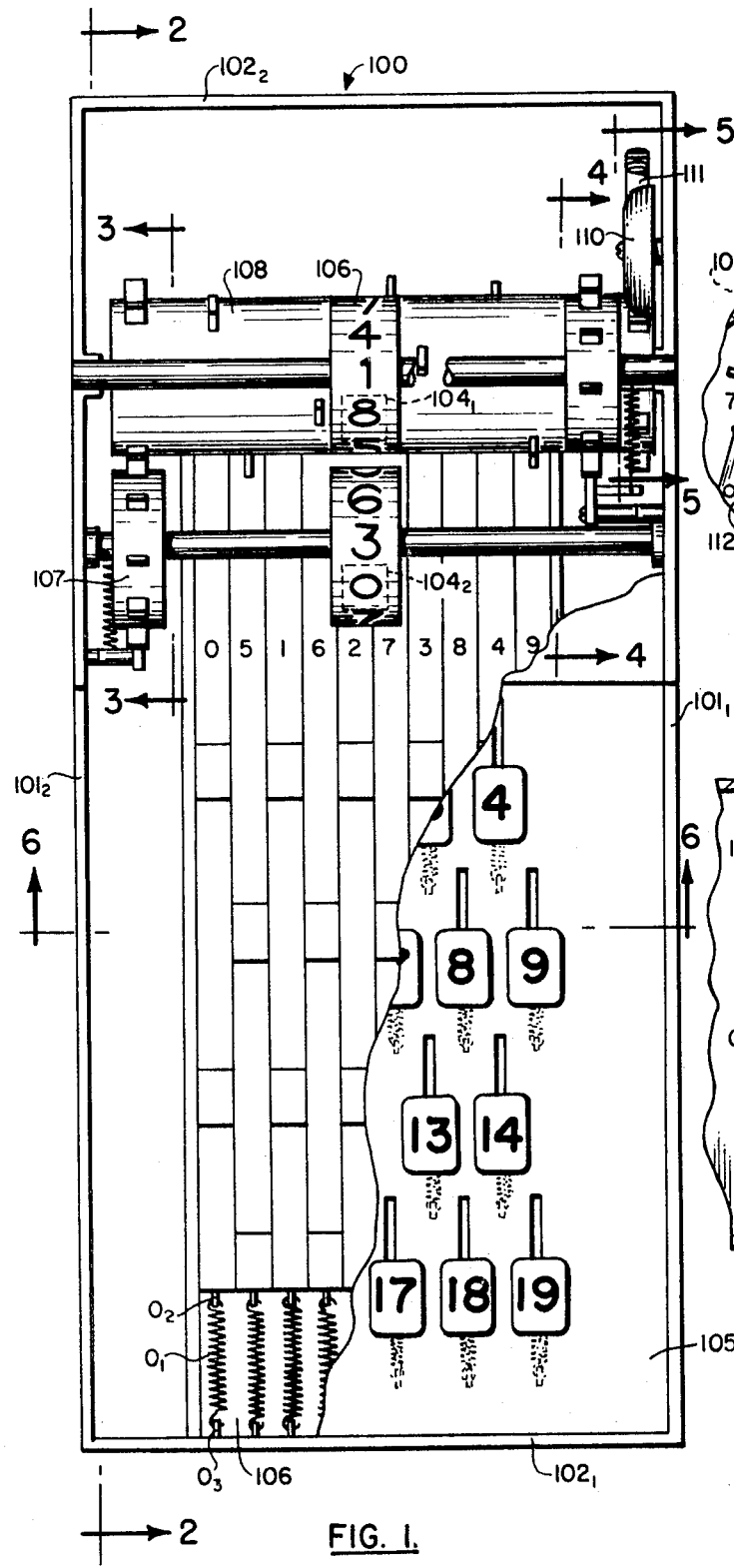
Figure 7:
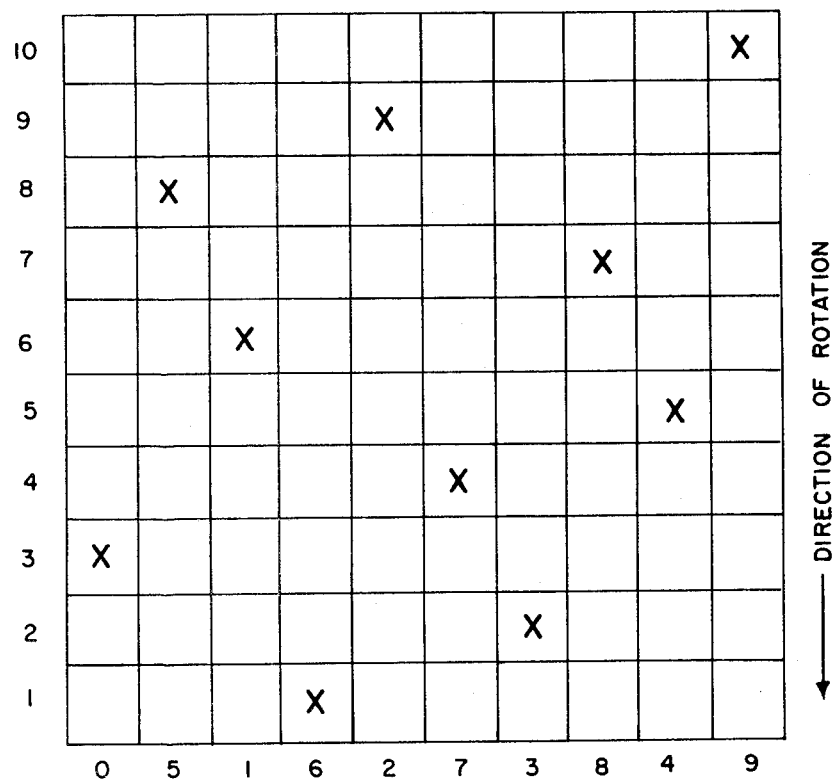

FIG. 6 is a fragmentary section view, taken along lines 6—6 of FIG. 1, this view showing the relationship between the number containing keys, and the slide bars which they actuate, in recording a solution to a displayed problem; and FIG. 7 is a schematic diagram showing positions on the drive roll periphery for each of 10 cogs, one cog corresponding to and aligned with one of the slide bars actuated by answer keys located on the keyboard; by virtue of which positional relationship the scribed rolls are rotated by the drive roll in patterned sequence.

Referring to FIGS. 1 and 2 generally, there is shown a suitable housing 100 constituted in part of a pair of parallel sidewalls $101_1$, $101_2$ and an enclosing pair of end walls $102_1$, $102_2$. At one extremity the sidewalls $101_1$, $101_2$ are elevated or raised, as is the enclosing end wall $102_2$, to form an enlarged volume. Within the enlarged end of the housing 100, and journaled upon the walls $101_1$, $101_2$, there is provided a plurality of three cylindrical-shaped members, or rolls 106, 107, 108 on two of which (106,107) series of numbers, preferably in irregular patterns, ranging from 0 through 9 are scribed. Each roll is independently mounted, one in close proximity to another, and meshed or geared together to rotate in predetermined patterned sequence. The housing 100 is also enclosed by a bottom panel or floor 103, the enlarged portion of the housing is enclosed beneath an upper panel 104, provided with a pair of windows $104_1$, $104_2$. The pair of windows $104_1$, $104_2$ are arranged each to show a single number, of a series scribed on each of the pair of rolls 106,107, respectively.

At the lower elevated portion of the structure, a removable cover 105, provided with 20 individual elongated slots arranged by pairs in 10 separate rows, shelters a series of 10 individually, horizontally, reciprocably mounted slide bars numbered, e.g., from left to right, 0, 5, 1, 6, 2, 7, 3, 8, 4, 9. Above each slide bar, in each of the individual rows of paired slots of cover 105, there is provided a pair of individually reciprocable keys operatively engageable with each of the respective slide bars. Each individual slide bar, e.g., side bar 0, rests in place upon the floor plate 103, is slidably movable thereon, and normally retained in rearward position, against the stop member 109, under tension of a spring, e.g., $O_1$, which is attached to the bar 0 itself and to the end wall $102_1$ via the hooklike members $0_2, 0_3$. Similar springs, similarly arranged, are provided for the other nine slide bars.

Each of the 20 individual elongated slots within the cover 105 is adapted for receipt of an individually numbered key, numbered, e.g., from 0 through 19. Each of the reciprocally mounted keys within a row is engageable with a bar, respectively, for the slidable forward movement thereof, e.g., keys K–0,K–10 of the first row to the left are engageable with slide bar 0. Keys K–0,K–10 are thus provided with lower portions of reduced size K–$0_1$,K–$10_1$ which extend through an individual elongated slot, and shanks K–$0_2$,K–$10_2$ which engage the raised projections SB–$0_1$,SB–$0_2$ of slide bar 0. Each of the keys, e.g., keys K–1,K–10, are normally retained in rearward position within an individual elongated slot under tension of a spring SK–0,SK–10 held in place via engagement between shanks K–$0_2$,K–$10_2$, respectively, and posts P–$0_1$,P–$0_2$ located on the lower face of cover 105 to the rear of the respective slot opening. Forward movement of a key would thus urge a slide bar forward for contact with a cog of lower roll 108 and, upon release of the key, both the key and the slide bar would return to their respective rearward position due to the action of the tensioned strings. All of the other pairs of keys, in conjunction with their respective slide bars, are similarly arranged and matched on the keyboard, as follows:

| Row No. (left to right) | 1 | 2 | 3 | 4 | 5 | 6 | 7 | 8 | 9 | 10 |
|---|---|---|---|---|---|---|---|---|---|---|
| Keys: | | | | | | | | | | |
| Row No. 1 (lateral) | 0 | 1 | 2 | 3 | 4 | | | | | |
| Row No. 2 (lateral) | 5 | 6 | 7 | 8 | 9 | | | | | |
| Row No. 3 (lateral) | 10 | 11 | 12 | 13 | 14 | | | | | |
| Row No. 4 (lateral) | 15 | 16 | 17 | 18 | 19 | | | | | |
| Corresponding slide bar | 0 | 5 | 1 | 6 | 2 | 7 | 3 | 8 | 4 | 9 |

A series of 13 rows of cogs is arranged in different, separate, and distinct parallel planes about the circumference of the lower roll 108, in essence a drive roll for patterned rotation of rolls 106,107. An outermost row of cogs (FIG. 5) provides for operation of a bell upon every movement of roll 108. A row of cogs (FIG. 4) immediately adjacent thereto provides for the patterned rotation of upper roll 106. Another outermost row of cogs (FIG. 3) provides for the patterned rotation of forward roll 107. The forward ends of the series of slide bars are adapted for direct contact or engagement with the 10 inner rows of cogs, in patterned sequence. Each of the 10 rows contains a single cog, each spaced at 36° intervals about the circumference of drive roll 108. Taking the individual cogs as planes of reference, the drive roll 108 can thus be considered as divided into a series of 10 equally separated planes intersecting at the axis of the drive roll 108. Each of the planes thus contacts the surface of the roll at 36° intervals and, within each of the 10 parallel planes (or rows) in desired sequence there is located a single cog. Ten sequential contacts between the forward end of a slide bar, and its respective cog on the drive roll, will thus rotate the drive roll 108 through one complete revolution.

The circumference or periphery of roll 108 is thus arrayed with a plurality of cogs, aligned in 10 distinct planes for separate and individual contact with the forward ends of the 10 separate and distinct slide bars. Within these inner 10 rows, a cog is located at every 36° interval about the circumference of roll 108, and at any given roll position only one of the slide bars id capable of contacting a cog for rotation or movement of the drive roll through a 36° angle to its next station or position.

Rotation of the drive roll 108, by action thereon of a slide bar representing a correct arithmetic solution to the displayed problem, produces rotation of the one or the other of the rolls 106,107 to which the former is operatively engaged. Every rotation of roll 108, in response to a single reciprocation of a slide bar, is through a counterclockwise angle of rotation of 36°, and every consequent clockwise rotation produced upon roll 106 or roll 107 is through the same angle of rotation. On every movement of roll 106 or roll 107 a new combination or pair of numbers is displayed and framed within windows $104_1$, $104_2$. Every correct solution produces a new combination of paired numbers for arithmetic solution, and also a responsive sound.

Referring specifically to FIG. 5, it will be observed that the bell 110 is struck by the hammer 111 each time roll 108 moves or turns. Thus, an outermost row of cogs is provided in a plane on roll 108 separated from those within the path of movement of the slide bars. A series of 10 evenly spaced cogs is provided so that on each movement or 36° rotation of roll 108 the hammer is raised by action of a cog upon the shank portion $111_1$, which places the spring S-111 under tension, and then, on further movement, permits the hammer 111 to fall. The bell is thus sounded for every fractional rotation of drive roll 108, or every correct solution to a problem.

Figure 3:
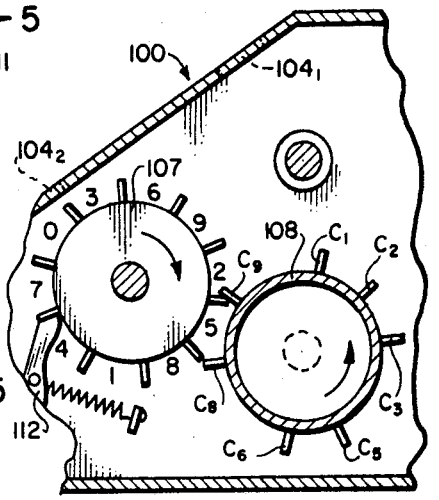
FIG. 3 is a fragmentary side elevation view, taken along lines 3—3 of the first figure, this view showing the relationship between the forward roll, of the pair of scribed or driven rolls, and the drive roll which acts thereon.
Figure 4:
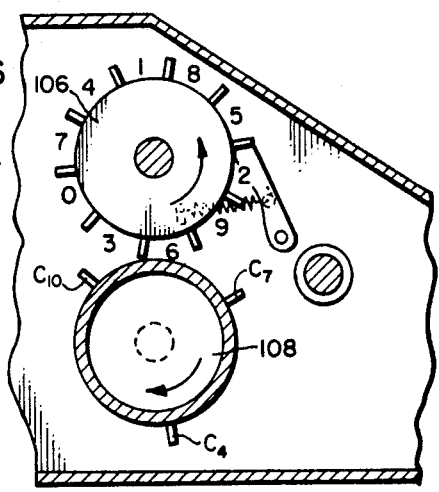
FIG. 4 is a fragmentary side elevation view, taken along lines 4—4 of the first figure, this view showing the relationship between the upper roll of the pair of scribed or driven rolls, the drive roll which acts thereon, and taken with the preceding figure the interrelationship of the forward roll, upper roll and the drive roll.

The mechanism by virtue of which drive roll 108 actuates and rotates rolls 106,107 through a preselected pattern, arranged as solutions to individual problems, is shown by reference to FIGS. 3 and 4. The sum-total number of cogs on roll 108 for driving the roll 107 (FIG. 3)—viz, $C_1$, $C_2$, $C_3$, $C_5$, $C_6$, $C_8$ and $C_9$—and those for driving roll 106 (FIG. 4)—viz, $C_4$, $C_7$ and $C_{10}$—is 10, this number corresponding to the number of slide bars. The cogs are alternately arranged, or patterned, so that only one roll of the roll pair 106,107 is turned for any single movement of drive roll 108. Ten 36° rotations of the drive roll 108 produce one complete rotation of drive roll 108, but during this time roll 107 completes only seven-tenths of a rotation, and roll 106 only three-tenths of a rotation. Stated in another way, for each 10 complete rotations of roll 108, roll 107 runs through seven complete rotations, and roll 106 through three complete rotations. The roll sequence of movement is defined by the pattern one-one-two-one-one-two-one-one-one-two (and repeats ad infinitum). In the specific deposition of the rolls 106, 107, 108, rolls 106,107 are alternatively rotated through the following pattern, and sequence, to frame the following numbers within windows $104_1$,$104_2$, respectively:

| Roll movements 108 from start [1] | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Roll 107 | 0 | 7 | 7 | 4 | 1 | 1 | 8 | 5 | 2 | 2 | 9 | 6 | 6 | 3 |
| Roll 106 | 8 | 8 | 5 | 5 | 5 | 2 | 2 | 2 | 2 | 9 | 9 | 9 | 6 | 6 |
| Roll moved (sequence) | 1 | 1 | 2 | 1 | 1 | 2 | 1 | 1 | 1 | 2 | 1 | 1 | 2 | 1 |

[1] I.e., number of 36° movements.

Referring to FIG. 3 is thus shown in relationship between drive roll 108 and forward roll 107 in solution of a problem eight plus zero as framed in windows $104_1$,$104_2$: The correct solution, of course, is eight which is represented by manipulation of key 8 (or 18) to produce forward movement of slide bar 8 to actuate and rotate roll 108. The latter roll 107, which turns in a clockwise direction, is thus provided with an outer row of 10 cogs evenly spaced about the circumference thereof, in a single plane. A spring loaded pivotally connected stop member 112, which rides over and drops down between the cogs as the roll rotates, prevents movement of the roll 107 in the opposite direction. Referring to the roll 108, which turns counterclockwise, and taking an imaginary vertical line through the center thereof for orientation, and counting to the right, it will be observed that cogs are shown in positions $C_1$, $C_2$, $C_3$, $C_5$, $C_6$, $C_8$ and $C_9$. Positions $C_4$, $C_7$ and $C_{10}$ are blank. A 36° rotation of rolls 108 (responsive to forward movement of slide bar 8) causes impingement of the cog in position $C_9$ upon a cog of roll 107, and moves the roll 107 through 36°. This moves the number 0 upward, ringing the bell, and framing number 7 within window $104_2$. Simultaneously, therewith, the blank position $C_{10}$ or roll 108 moves to the position formerly occupied by the cog $C_9$.

With reference to FIG. 4, while the numeral 0 is framed within window $104_2$, the numeral 8 is framed in window $104_1$. Taking an imaginary vertical line through the center of roll 108, and counting upwardly from the bottom to the right, it will be observed that cogs are shown in positions $C_4$, $C_7$, $C_{10}$. Positions $C_1$, $C_2$, $C_3$, $C_5$, $C_6$, $C_8$ and $C_9$ are blank. As the roll 107 is caused to rotate, as discussed with reference to FIG. 3, the blank position $C_{10}$ of the row of cogs operative on the cogs of roll 107 is displaced to the position formerly occupied by the cog $C_9$. As this happens, the roll 106 does not turn, and the numeral 8 remains framed in window $104_1$. This is because there is no cog in the blank position $C_9$ of roll 108 for producing motion of roll 106. Thus, the numeral 8 remains framed in window $104_1$ while the number 7 becomes framed in window $104_2$. The blank $C_{10}$ of FIG. 3, as this happens, now moves to the position formerly occupied by cog $C_9$. Forward movement of the slide bar 5, by manipulation of key 15 (or 5), the numeral 15 representing the correct solution to the sum of 8 and 7, now moves the cog $C_{10}$ into engagement with a cog of roll 106 and moves the latter to frame the number 5 within the window $104_1$. The sequence is repeated ad infinitum.

The relationship by virtue of which rolls 106,107 are alternatively rotated in patterned sequence by drive roll 108 to frame pairs of numbers in windows $104_1$,$104_2$, respectively, is thus accomplished by the arrangement of the cogs upon the drive roll 108. Cogs are also arranged upon drive roll 108 for contact by the forward ends of slide bars to rotate the former, in the pattern suggested and schematically represented by reference to FIG. 7. Roll 108, rotation of which is in the direction shown, is thus shown in planar or "unrolled" form. The roll can thus be divided into 10 parallel or vertical rows, each row of which contains a single cog represented by the letter $x$. Each of the cogs $x$ can be contacted only by a single-slide bar, viz, 0, 5, 1, 6, 2, 7, 3, 8, 4, 9 which operated upon the cogs of the similarly numbered vertical columns. Each cog $x$ is also located in 10 separate horizontal rows numbered 1 through 10 for convenience, these representing 36° intervals. Where, at the starting position, roll 107 carried the numeral 0 and roll 106 the numeral 8 framed within windows $104_1$,$104_2$, respectively, the solution to the problem is eight, and movement of slide bar 8 will contact cog $x$ of horizontal row 7 to rotate roll 108 through 36°. In turn, drive roll 108 moves roll 107 and numeral 7 is framed in window $104_2$. The next problem is 7+8 and its solution is 15. Actuation of slide bar 5 contacts the cog of row 5 which has moved from horizontal row 8 to horizontal row 7 and roll 108 is again rotated through 36°. Roll 106 is similarly rotated to frame the numeral 5 within window $104_1$. The next problem is 5+7 and the solution is 12. Actuation of slide bar 2 contacts the cog $x$ which has now moved to horizontal row 7 and roll 108 is again rotated through a 36° angle of rotation. Roll 107 is similarly rotated in response to roll 108 to frame the numeral 4 in window $104_2$. The pattern can thus be represented as follows:

| Problem | Solution | Problem | Solution |
|---------|----------|---------|----------|
| 0+8 | 8 | 0+3 | 3 |
| 7+8 | 15 | 7+3 | 10 |
| 7+5 | 12 | 4+3 | 7 |
| 4+5 | 9 | 1+3 | 4 |
| 1+5 | 6 | 1+0 | 1 |
| 1+2 | 3 | 8+0 | 8 |
| 8+2 | 10 | 5+0 | 5 |
| 5+2 | 7 | 5+7 | 12 |
| 2+2 | 4 | 2+7 | 9 |
| 2+9 | 11 | 9+7 | 16 |
| 9+9 | 18 | 9+4 | 13 |
| 6+9 | 15 | 6+4 | 10 |
| 6+6 | 12 | 3+4 | 7 |
| 3+6 | 9 | 0+4 | 4 |

The present apparatus is thus designed to present a simple addition problem comprising a pair of one-digit numbers ranging from zero through nine, offer a choice of answers ranging from 0 to 19, and a response only to a correct solution. Upon offering a correct solution a signal will be given, and another problem will be presented. In the preferred device, the combinations of numbers are presented in irregular sequence without repetition until the whole series is complete. The sequence is set to provide maximum variations in possible numbers, and anticipation of answers by observation of patterns is avoided.

It is apparent that various changes, such as in the absolute or relative dimension of the parts, or in the specific patterns selected, can be made without departing the spirit and scope of the invention, as will be apparent to those skilled in the art.

It is also apparent to those skilled in the art that although cylindrical rolls are described, flat circular disks can be employed; whereas three rolls are mentioned, the drive roll and one of the secondary rolls may be one and the same; the horizontal slide bars might be operated indirectly by movement of a vertically moving key; a spring-operated or motor-operated drive roll may be activated by pressure of the solution key which could release the drive roll and allow it to move to the next position.

It is also apparent to those skilled in the art that problems of subtraction resulting in solutions of one-digit numbers can readily be adaptable to the apparatus described for problems of addition.

Having described the invention, what is claimed is:

1. Apparatus for instructing beginning students in the addition of pairs of one-digit numbers comprising, in combination,
   a housing, including a pair of parallel aligned sidewalls, end walls and a floor panel,
   a plurality of three rolls journaled upon the sidewalls of the housing, a drive roll and two secondary rolls, each secondary roll being scribed with a series of one-digit numbers ranging zero through nine, each secondary roll displaying a number so that pairs of the one-digit numbers are displayed for solution, the rolls being meshed together so that fractional rotation of the drive roll through a series of 36° turns will produce a corresponding angular rotation of the scribed secondary rolls in alternate patterned sequence to display a new problem for arithmetic solution,
   a keyboard provided with 10 pairs of reciprocably mounted keys, located in 10 separate rows, each individually scribed with one of a series of numbers corresponding to the summations of the pairs of one-digit numbers displayed by the scribed secondary rolls, each of the paired keys differing one from the other by 10,
   a plurality of 10 independently reciprocable slide bars mounted upon the floor panel, each operatively and separately engaged by a pair of the reciprocably mounted keys, each tangentially engageable in preselected pattern with the drive roll, so that fractional rotation of the latter produces corresponding fractional rotation, in alternate patterned sequence, of one and then the other of the secondary scribed rolls,
   whereby each manipulation of one of the pair of keys, representative of a correct solution to a displayed problem, moves a slide bar into tangential contact with the drive roll, such contact producing fractional angular rotation of the drive roll, and a corresponding fractional angular rotation of a secondary roll to display a new arithmetic problem for solution.

2. The apparatus of claim 1 wherein the pairs of keys are arranged, with respect to the 10 slide bars, in the following pattern:

| Row No. (left to right) | 1 | 2 | 3 | 4 | 5 | 6 | 7 | 8 | 9 | 10 |
|---|---|---|---|---|---|---|---|---|---|---|
| Keys: | | | | | | | | | | |
| Row No. 1 (lateral) | 0 | 1 | 2 | 3 | 4 | | | | | |
| Row No. 2 (lateral) | | | | | | 5 | 6 | 7 | 8 | 9 |
| Row No. 3 (lateral) | 10 | 11 | 12 | 13 | 14 | | | | | |
| Row No. 4 (lateral) | | | | | | 15 | 16 | 17 | 18 | 19 |
| Corresponding slide bar | 0 | 5 | 1 | 6 | 2 | 7 | 3 | 8 | 4 | 9 |

3. The apparatus of claim 1 wherein the secondary rolls, and the drive roll are provided with series of intermeshing cogs, each of the secondary rolls being provided with a continuous row of cogs, located in one vertical plane and separated one from another by 36° intervals, the drive roll is provided with a first and second series of cogs meshing, respectively, with each of the said continuous rows of cogs of the secondary rolls to produce actuation and corresponding fractional rotation of the pair of secondary rolls, in alternate prepatterned sequence as the drive roll is rotated, and a third series individually separated by 36° intervals, and aligned in 10 separate parallel rows for individual contact by the 10 slide bars to produce fractional angular rotation of the drive roll, and a corresponding fractional angular rotation of a secondary roll in response to a correct solution to a problem displayed on the secondary rolls.

4. The apparatus of claim 3 wherein the first series of cogs on the drive roll are arranged in a pattern of 1, 2, 3, 5, 6, 8 and 9, of the 10 possible positions which are separated at 36° intervals, to actuate and rotate a first of the secondary rolls which turns in a clockwise direction, and a second series of cogs arranged in a pattern of 4, 7 and 10, of the 10 possible positions which are separated at 36° intervals, to rotate a second of the secondary rolls which turns in clockwise direction.

5. The apparatus of claim 4 wherein the second of the secondary rolls is mounted above the first of the secondary rolls, and the latter is mounted forward of the second secondary roll, and the number displayed by each is framed in windows contained in a panel covering the pairs of rolls.

6. The apparatus of claim 3 wherein the 10 slide bars are arranged in a pattern, from left to right, of 0, 5, 1, 6, 2, 7, 3, 8, 4, 9 for contact and actuation with individual cogs of the third series of 10 parallel rows of cogs located on the drive roll, this representing the 100 additive solutions to pairs of one-digit numbers in the conventional number system, respectively, as follows:

0,10    nine tens and one zero 5,15    four fifteens and six fives 1,11    eight elevens and two ones 6,16    three sixteens and seven sixes 2,12    seven twelves and three twos 7,17    two seventeens and eight sevens 3,13 six thirteens and four threes 8,18 one eighteen and nine eights 4,14 five fourteens and five fours 9,19 ten nines 7. The apparatus of claim 6 further defined in that the individual cogs of the drive roll are arranged in a pattern of 10 horizontal rows, representing 36 intervals on the drive roll surface, for contact with individual slide bars, numbered from left to right 0, 5, 1, 6, 2, 7, 3, 8, 4, 9 as indicated by the graphical description described with reference to FIG. 7 of the drawings.

8. The apparatus of claim 3 wherein the drive roll is provided with a fourth series of cogs, separated at 36° intervals one from another and located in a single vertical plane for actuation of a spring tensioned hammer for contact with a ball to produce a signal when the drive roll is rotated, in response to a correct solution of a displayed problem.

9. Apparatus for instructing beginning students in the addition of pairs of one-digit numbers comprising, in combination,
a housing, including a pair of parallel aligned sidewalls, and floor panel,
a drive roll and two secondary rolls journaled upon the sidewalls of the housing, each of the secondary rolls being scribed with a series of one-digit numbers ranging from zero through nine, each secondary roll displaying a number so that pairs of one-digit numbers are displayed for addition solution, the rolls being meshed together so that rotation of the drive roll through a series of 36° turns will produce corresponding angular rotations of the secondary rolls in alternate patterned sequence to display new problems for addition solution,
ten independently actuatable contact members mounted upon the floor panel for engagement in preselected pattern with the drive roll for producing rotation of the said drive roll and secondary rolls through a series of 36° turns,
means directly integrated and associated with each of said contact members, each scribed to represent the 10 series of numbers corresponding to the summation of the pairs of one-digit numbers scribed on the secondary rolls,
whereby each selection of a correct arithmetic solution to a displayed problem produces engagement between a contact member causing rotation of the drive roll, and a secondary roll to display a new arithmetic problem for solution.

* * * * *